1,784,216

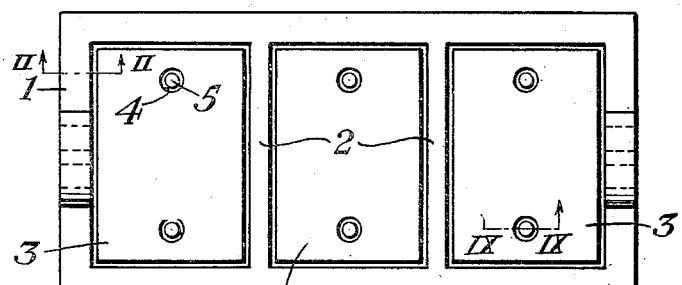
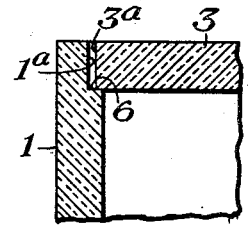
Fig.1. Fig.2.
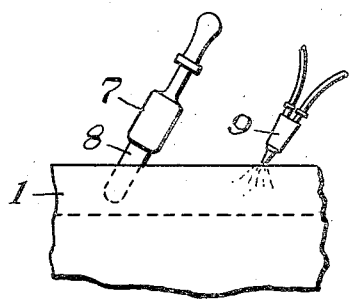
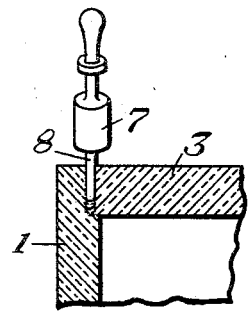
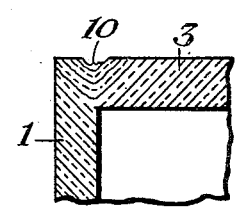
Fig.3. Fig.4. Fig.5.
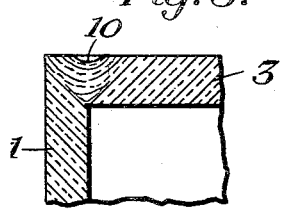
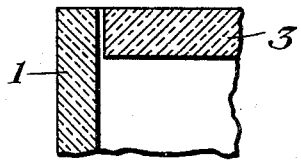
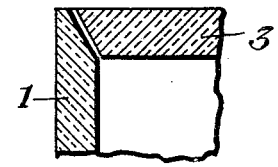
Fig.6. Fig.7. Fig.8.
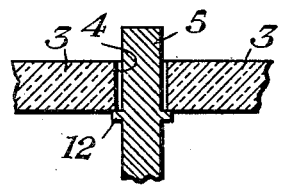
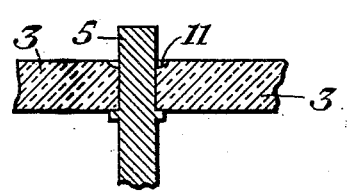
Fig.9. Fig.10.
INVENTORS.
H. H. Aldrich,
J. L. Rupp,
Their attorney Patented Dec. 9, 1930

UNITED STATES PATENT OFFICE

HERBERT H. ALDRICH AND JOHN L. RUPP, OF WILKINSBURG, PENNSYLVANIA, ASSIGNORS, BY MESNE ASSIGNMENTS, TO WUBCO BATTERY CORPORATION, OF NIAGARA FALLS, NEW YORK, A CORPORATION OF NEW YORK

PROCESS AND MEANS FOR SEALING STORAGE BATTERIES

Application filed April 5, 1927, Serial No. 181,127. Renewed April 11, 1930.

Our invention relates to processes of sealing storage batteries, and particularly batteries comprising containers made of fusible insulating material.

One object of our invention is to render unnecessary the use of sealing compound for filling the joints between the storage battery cover and the associated parts.

We will describe one process of sealing storage batteries embodying our invention, and will then point out the novel features thereof in claims.

In the accompanying drawing, Fig. 1 is a top view of a storage battery with the cover in place, but not sealed and without the connecting straps applied. Fig. 2 is a sectional view on the line II—II of Fig. 1. Figs. 3 and 4 are side and sectional views respectively, showing one step in a process embodying our invention. Figs. 5 and 6 are views similar to Fig. 2 and showing further steps in the process. Figs. 7 and 8 are sectional views showing modified forms of joints to which processes embodying our invention are applicable. Fig. 9 is a sectional view on line IX—IX of Fig. 1. Fig. 10 is a view similar to Fig. 9 showing the condition of the parts after the final step in a process embodying our invention.

Similar reference characters refer to similar parts in each of the several views.

Referring first to Fig. 1, the reference character 1 designates a storage battery container composed of fusible insulating material which may, for example, be bitumen reinforced by fibrous material. Such material resists the action of sulphuric acid and is sufficiently rigid to withstand shocks to which battery containers are subjected in use. Formed integrally with the side walls of the container are a plurality of partitions 2 which divide the container into separate compartments. As here shown each compartment is closed by means of a cell cover 3, suitable openings 4 being provided in each cover to accommodate the terminal posts 5 of the battery cells which occupy the compartments. The covers 3 are preferably composed of a fusible insulating material similar to that of which the container is made.

As shown in Fig. 2, wall 1 is cut away to provide a shoulder 6 for the purpose of supporting the cover 3, and when this cover is in place a narrow groove is left between the face 1$^a$ of the wall 1 and the face 3$^a$ of cover 3. It has heretofore been customary in sealing batteries to place the cover in position and then to fill this groove with hot sealing compound so as to form a liquid tight joint between the container wall and the cover. Processes embodying our invention render the addition of this sealing compound unnecessary in sealing a battery. In carrying out one such process the faces 1$^a$ and 3$^a$ are heated and the softened material is kneaded down into this groove and ironed into place until the groove is completely filled. As shown in Fig. 3 the faces of the wall and cover are heated by means of an open concentrated flame from a suitable torch 9, and when these faces are heated sufficiently, a hot soldering copper 7 having a thin elongated blade 8 is passed through the groove in such manner as to iron the molten material into place and to knead it into a homogeneous mass which completely fills the groove between the wall 1 and the cover 3. After this step in the process is completed, the union between the side wall and the cover appears as in Fig. 5 in which the upper surface 10 of the joint is rough and irregular. After the entire outside contacting surface of the cover 3 has been united to the associated container wall, the joint between these two parts may be finished by the application of heat and pressure. This smoothing process may be carried out by means of a heated soldering iron which produces a smooth groove 10 at the top of the joint between the wall 1 and the cover 3 as shown in Fig. 6.

In some instances it may not be desirable to provide the wall 1 with a shoulder for the purpose of supporting the cell cover, and in such case the cover is supported by the terminal post of the battery so that the adjoining faces of the wall 1 and the cover 3 appear as in Fig. 7. It may also be desirable to bevel the adjacent surfaces of the wall 1 and the cover 3 as shown in Fig. 8, the cover 3 in this instance also being supported by the terminal posts of the battery. Processes embodying our invention are applicable to the sealing of batteries in which these forms of joint are used.

After the covers 3 of the battery are sealed into contact with the walls of the container, it is necessary also to seal the opening between the projecting posts 5 of the battery and the associated openings 4 in the cover. As shown in Fig. 9 the side walls of the opening 4 are spaced from the sides of the terminal post 5 and the cover 3 is supported by a projecting flange 12 on the terminal post 5. In sealing the opening between the terminal post 5 and the cover 3, heat is applied to the edges of the opening until the material fuses sufficiently to allow it to be kneaded into the bottom of the groove, the groove being completely filled and the softened material forming a close contact with the sides of the post. After this fusing process the surface of the cover in proximity to the face will be more or less irregular, but a smoothing iron may be passed over this surface to produce a smooth shallow groove 11 as shown in Fig. 10.

It will now be clear that processes embodying our invention may be used not only to seal the contacting surface between a battery cover and the container, but are equally applicable to sealing the openings between the projecting terminal posts and the battery cover, and that such processes materially simplify the construction of the battery since the necessity of using a separate sealing compound is avoided. Another advantage of our invention is that the battery cover may be constructed of the same material as that of the battery container.

Although we have herein shown and described only one process and means for sealing storage batteries, it is understood that various changes and modifications may be made therein within the scope of the appended claims without departing from the spirit and scope of our invention.

Having thus described our invention, what we claim is:

1. The process of closing a container composed of a bituminous composition which consists in applying a cover of the same material to the container, heating the adjoining faces of the cover and container until such faces flow together, and then ironing the joint to form a homogeneous union.

2. The process of closing a container composed of a bituminous composition, which consists in applying a cover of the same material to the container, heating the adjoining faces of the cover and container until such faces fuse together, ironing the joint to form a homogeneous union, and then smoothing the joint by the application of heat and pressure.

3. The process of closing a container composed of bituminous material and a cover of the same material with members projecting through said cover, which consists in applying heat to the adjoining faces of the casing and cover, ironing the material until such faces are joined in homogeneous union, and then heating and working the faces of the cover about said members until the material flows into intimate contact with said members.

4. The process of closing a container composed of bituminous material, which consists in applying a cover of bituminous material thereto, heating and ironing the adjoining faces of the container until such edges unite, and then smoothing the joint by the application of heat and pressure.

5. The process of closing a container composed of bituminous material which consists in applying a cover of the same material to the container, heating the adjoining faces of the cover and container until the parts fuse together and then smoothing the joint by the application of heat and pressure.

6. The process of sealing a storage battery comprising a container and a cover both of bituminous material, which consists in heating and ironing the adjoining faces of the container and cover until such faces fuse together, smoothing the joint between the edges by the application of heat and pressure, and then fusing and ironing the cover into intimate contact with the battery posts.

In testimony whereof we affix our signatures.

HERBERT H. ALDRICH.
JOHN L. RUPP.